May 3, 1938.   G. E. NERNEY   2,115,783

EYEGLASS CONSTRUCTION

Filed Sept. 25, 1935

INVENTOR
George E. Nerney
BY
Blair, Curtis & Dunne
ATTORNEYS

Patented May 3, 1938

2,115,783

UNITED STATES PATENT OFFICE

2,115,783

EYEGLASS CONSTRUCTION

George E. Nerney, Attleboro, Mass., assignor to Bay State Optical Company, Attleboro, Mass., a corporation of Maine Application September 25, 1935, Serial No. 42,036

6 Claims. (Cl. 88—43)

This invention relates to an eyeglass construction and to a method of constructing a bridge or the like for a pair of eyeglasses.

One of the objects of this invention is to provide an eyeglass construction which will be simple, practical and thoroughly durable. Another object is to provide a construction of the above character which will be attractive in appearance and effective in operation. Another object is to provide a construction of the above character which may be manufactured economically with a minimum amount of labor. Another object is to provide a construction of the above character wherein the individual parts as well as their particular construction are so designed as to reduce expenditure of materials or the like. Another object is to provide a construction of the above character which may be easily assembled and adjusted to suit the particular needs of the wearer. Another object is to provide a construction of the above character which will be light in weight and yet be of such sturdy construction as to withstand hard usage. Another object is to provide a construction of the above character which will be sturdy at the point at which the bridge is attached to the lens clamp or frame. Other objects will be in part obvious and in part pointed out hereinafter.

The invention accordingly consists in the features of construction, combinations of elements, arrangements of parts and in the several steps and relation and order of each of the same to one or more of the others, all as will be illustratively described herein, and the scope of the application of which will be indicated in the following claims.

In the accompanying drawing in which are shown several of the various possible embodiments of this invention, Figure 1 is a fragmentary front elevation of a portion of an eyeglass frame;

Similar reference characters refer to similar parts throughout the several views of the drawing.

As conducive to a clearer understanding of certain features of this invention, it might here be pointed out that the construction of a bridge for eyeglass frames has been accompanied by considerable difficulty and inconvenience as, for example, the attempt to produce a bridge which will be sturdy in its attachment to the lens clamp or frame of the eyeglass and yet be light in weight. In the past, the usual custom has been to secure the bridge to the lens clamp or frame at one point. In use, when the lenses are twisted or are forced in any direction out of the normal plane in which they lie, the greatest strain is placed upon this point. In order to secure a strong connection at this point, it has been necessary to have a bridge of very heavy construction so that the ends of the bridge will contact the lens clamp over a large area. The added weight of a bridge, if constructed in this manner, is a very undesirable feature of an eyeglass frame where the weight of the glasses is of paramount importance. A second weakness in eyeglass construction has been the fact that a single member has usually been used in constructing the bridge. A certain amount of strain is centered upon the middle of the bridge and at certain other points depending on the bridge's shape. Because of the fact that previously a single member has been used, every time the eyeglass frame is twisted the strain is always concentrated upon these points with the result that they may break or be partially damaged. One of the objects of this invention is to provide a device and a method for overcoming the above-mentioned difficulties as well as many others.

Figure 1:
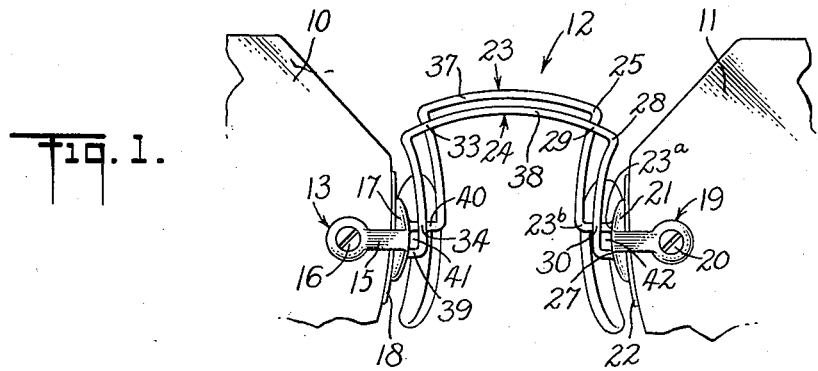

Referring now to the drawing in detail, there is shown in Figure 1 a pair of lenses 10 and 11 connected by way of a bridge generally indicated at 12. Connected to lens 10 is a lens retaining part generally indicated at 13 and including a pair of ears 14 and 15 (Figure 2) embracing the opposite surfaces of the lens. A screw 16 extends through ear 15 and lens 10 and is preferably threaded into ear 14 to hold the lens retaining part in position. Joining the ears 14 and 15 and substantially following the periphery of the lens 10 is a strap 17 which with screw 16 holds the lens retaining part 13 in position. Between the strap 17 and the lens 10 I preferably dispose a resilient strip of metal 18 also following the periphery of lens 10 and extending beyond the ends of strap 17.

A lens retaining part generally indicated at 19 is connected to lens 11, this part being substantially similar in construction to the retaining part 13. Accordingly, a screw 20 passes through both ears of part 19 and through the lens 11 to secure the ears in proper position, and a strap 21 having resilient strip 22 between it and the periphery of lens 11 is connected to the ears and also follows the periphery of lens 11.

Referring now to Figure 1, there are shown two members generally indicated at 23 and 24 preferably stamped from metal which, when placed together, form the bridge member. As their construction is substantially similar on both sides of a vertical line passing through their center, I will limit my description to one half of the bridge. Member 23 extends inwardly from the point 23a where it is attached to strap 21 and then upwardly preferably at a right angle from point 23b preferably curving slightly toward lens 11 to culminate in a portion 25 which extends inwardly from lens 11; in effect, substantially bridging the space between lenses 10 and 11.

Member 24 is secured to lens strap 21 at a point 27 below point 23a and thence extends inwardly a shorter distance from strap 21 than strap 23 from whence it extends upwardly crossing member 23 at point 30. Preferably this member extends upwardly about the same distance as member 24 and then culminates in a portion 28 substantially similar in shape to portion 25 of member 23. As member 24 is secured to the lens clamp 21 at a point below member 23, it crosses member 23 at point 29. Also members 23 and 24 cross at points 33 and 34 on the other side of the bridge structure.

Figure 2:
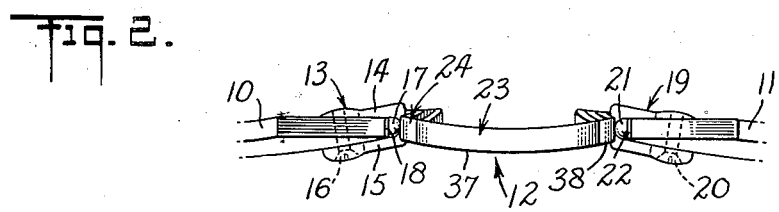
Figure 2 is a top plan view of the frame shown in Figure 1.
Figures 3, 4:
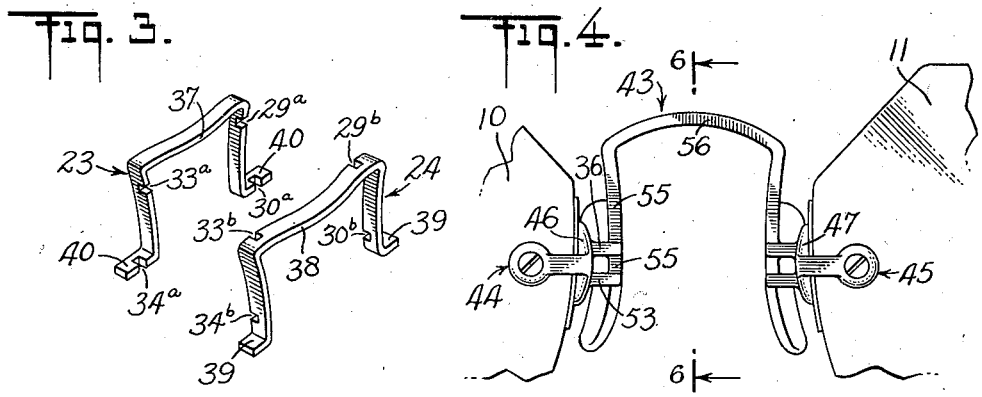
Figure 3 is an exploded perspective view of certain parts shown in Figure 1.
Figure 4 is a fragmentary front elevation of a modification of the eyeglass frame shown in Figure 1.

Referring now to Figure 3, I have shown the members 23 and 24 in exploded perspective. Previously I have pointed out that members 23 and 24 intersect at points 29 and 30, 33 and 34. At these points there are formed cut-out portions in members 23 and 24 preferably of a width which is equal to the thickness of the members and of a depth which is equal to sustantially half their width. Thus in member 23 there are cut-out or notch portions 34a, 33a, 29a and 30a and in member 24 cut-out portions 34b, 33b, 29b and 30b, all of these cut-out portions being located on opposing edges of the members. Thus, when members 23 and 24 are superimposed, the cut-out portions thereof interlock and edges 37 and 38 of members 23 and 24 lie in substantially the same plane throughout as best shown in Figure 2. It will now become clear that end feet 40 of member 23 are located directly above the end feet 39 of member 24 to define spaces 41 and 42 (Figure 1).

Referring now to Figure 4, in which there is shown another embodiment of my invention having a bridge generally indicated at 43 and lens clamps generally indicated at 44 and 45. Preferably, lens clamps 44 and 45 are of substantially the same construction as lens clamps 13 and 19 shown in Figure 1 and thus have straps 46 and 47. Furthermore, the construction on both sides of the bridge 43 is substantially similar and, therefore, the description will be limited to one side thereof.

Figures 5, 6:
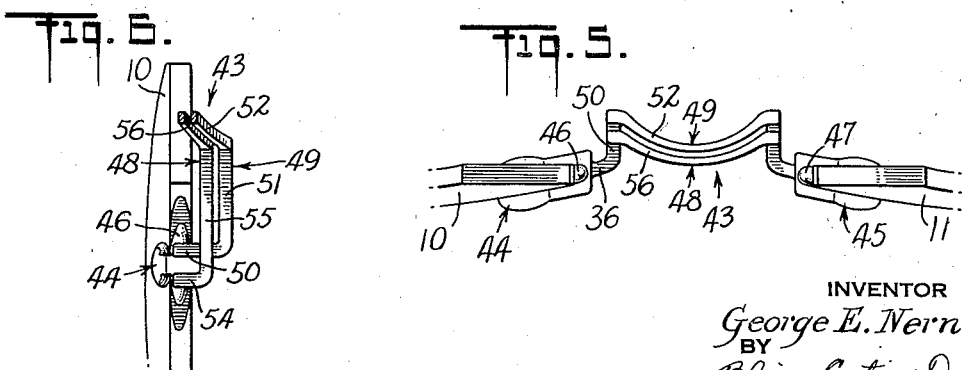
Figure 5 is a top plan view of the frame shown in Figure 4.
Figure 6 is a vertical sectional view taken along line 6—6 in Figure 4.

Bridge 43 preferably comprises a pair of members generally indicated at 48 and 49 (Figure 6). A foot portion 36 of member 49 is secured to strap 46 and extends inwardly therefrom. Next, member 49 curves rearwardly to form portion 50 after which it extends upwardly to form vertical portion 51 thereof (Figure 6). Finally, member 49 has a substantially horizontal portion 52 substantially bridging the space between the lenses.

A foot portion 53 of member 48 (Figure 4) is secured to strap 46 below foot portion 36 (Figure 4) and extends inwardly substantially the same distance as foot portion 36. Foot portion 53 terminates in a rearwardly extending portion 54 of the member 48, this rearwardly extending portion being preferably shorter than the corresponding portion 50 of member 49. Next, member 48 curves upwardly to form a vertical portion 55 intersecting with member 49 and thence preferably lying immediately in front of vertical portion 51 of member 48. Finally member 48 culminates in a substantially horizontal portion 56 preferably immediately in front of the corresponding portion of member 49.

The opposing edges of vertical portion 55 and rearwardly extending portion 50 are cut out in substantially the same manner as the cut-out portions of members 23 and 24 described more fully hereinabove. Thus these portions of members 48 and 49 are interlocked at the point of intersection so that the members comprise the unitary bridge structure 43. As best shown in Figure 6, horizontal portions 52 and 56 of members 49 and 48 respectively have their broadest surfaces parallel with the planes of the lenses. Thus the bridge member bends more easily about a vertical axis passing substantially through the central portion thereof. The opening and closing of temples in frames of this general character often cause strains which are focused about this vertical axis. It will be seen that the bridge 43 can take up the strains of such forces by bending, thus preventing injury to the frame and yet this bridge is sufficiently sturdy to perform its normal supporting function.

For purposes of description in the specification, and the claims to follow hereinafter, the expression "inward" signifies a general direction toward a vertical line passing through the center of the bridge of a frame, the expression "rearward" signifies a direction substantially toward the face of the wearer, the expression "upward" signifies a general direction toward the top of the frame as worn by the wearer, the expression "downward" opposite thereto, while the expression "outward" signifies a direction substantially away from the bridge and toward the sides of the head of the wearer.

Thus it can be seen that I have provided a sturdy bridge having two interlocked members giving a great deal of resiliency and pliability to the frame while being sufficiently sturdy to withstand normal conditions of use. I have also provided a method wherein the attachment of the bridge to the lens clamp or frame is comparatively simple and yet results in a very strong connection. Strains on the frame due to twisting or the like are taken up by the resilient characteristics of the bridge and the two-point connection between the bridge and frame on each side thereof counteracts any force tending to break the bridge away from the frame. I have therefore provided a construction which, while being neat and attractive, has adequate strength to withstand usual conditions of use.

Thus I have provided a thoroughly durable and efficient construction in which the several objects hereinbefore referred to as well as many others are successfully accomplished.

As many possible embodiments may be made of the mechanical features of the above invention and as the art herein described might be varied in various parts, all without departing from the scope of the invention, it is to be understood that all matter hereinabove set forth, or shown in the accompanying drawing is to be interpreted as illustrative and not in a limiting sense.

I claim:

1. In eyeglass construction, in combination, a pair of lenses, lens retaining parts secured to said lenses, and means forming a bridge secured to said parts, said bridge means including a plurality of notched members in superimposed relation and interlocked at their notched portions at points spaced from the points at which said members are attached to said pair of lenses.

2. In eyeglass construction, in combination, a pair of lenses, a lens retaining part connected to each of said lenses, a bridge member having horizontal and leg portions the general shape of an inverted U with each leg portion connected to one of said lens retaining parts, and a second bridge member having horizontal and leg portions the general shape of an inverted U with each leg portion connected to one of said lens retaining parts, the horizontal portion of said second bridge member being spaced below the horizontal portion of said first bridge member, and the leg portions of said first bridge member interlocked with the horizontal portion of said second bridge member.

3. In eyeglass construction, in combination, a pair of lenses, a lens retaining part connected to each of said lenses, a bridge member having horizontal and leg portions in the general shape of an inverted U and having foot portions extending at right angles from the ends of the leg portions thereof, said foot portions being connected to said lens retaining parts, and a second bridge member having horizontal and leg portions in the general shape of an inverted U and having foot portions extending at right angles from the legs thereof and connected to said lens retaining parts at points spaced below the point of connection of said first-mentioned foot portions, said first-mentioned foot portions being of greater length than said second-mentioned foot portions so that the leg portions of said second-mentioned bridge member intersect with said first-mentioned foot portions and are interlocked therewith at points spaced from the connections of said leg portions to said lens retaining parts.

4. In eyeglass construction, in combination, a pair of lenses, a lens retaining part connected to each of said lenses, a bridge member having the general shape of an inverted U including a horizontal portion and leg portions and having foot portions extending from the ends of said leg portions at right angles thereto, said foot portions being connected to said lens retaining parts, and a second bridge member having the general shape of an inverted U including a horizontal portion and leg portions and having foot portions extending from said leg portions at right angles and connected to said lens retaining parts at points spaced below the point of connection of said first-mentioned foot portions, said first-mentioned foot portions being of greater length than said second-mentioned foot portions so that the leg portions of the second-mentioned foot portions intersect with said first-mentioned foot portions and are interlocked therewith, said horizontal portion of said second-mentioned bridge member being of greater length than said horizontal portion of said first-mentioned bridge member so that said horizontal portion of said second-mentioned bridge member intersects with and is interlocked with the leg portions of said first-mentioned bridge member.

5. In eyeglass construction, in combination, a pair of lenses, a lens retaining part connected to each of said lenses, a bridge member having the general shape of an inverted U with its leg portions culminating in foot portions extending forwardly and thence substantially outwardly to be connected with said lens retaining parts, and a second bridge member having the general shape of an inverted U with its legs portions culminating in foot portions extending forwardly and thence outwardly to be connected with said lens retaining parts at points spaced below the points of connection of said first-mentioned bridge member with said lens retaining parts, the foot portions of said first-mentioned bridge member being longer than the foot portions of said second-mentioned bridge member so that the leg portions of said second-mentioned bridge member cross the foot portions of said first-mentioned bridge member and are interlocked therewith.

6. In eyeglass construction, in combination, a pair of lenses, and means forming a bridge secured to said lenses, said bridge including two members, one end of each of said members being secured to one of said lenses, the points of connection of corresponding ends of said members to said lenses being spaced from each other, said members being so shaped that they cross one another at a plurality of points spaced from the connections of said ends to said lenses, said members being rigidly connected at the points at which they cross.

GEORGE E. NERNEY.